(12) United States Patent
Richards et al.

(10) Patent No.: US 11,719,049 B2
(45) Date of Patent: Aug. 8, 2023

(54) NEARSHORE SUBSEA DRILLING

(71) Applicant: FNV IP B.V., Leidschendam (NL)

(72) Inventors: Peter David Richards, Leidschendam (NL); James Alexander Amos, Leidschendam (NL)

(73) Assignee: FNV IP B.V., Leidschendam (NL)

(*) Notice: Subject to any disclaimer, the term of this patent is extended or adjusted under 35 U.S.C. 154(b) by 0 days.

(21) Appl. No.: 17/778,045

(22) PCT Filed: Nov. 5, 2020

(86) PCT No.: PCT/NL2020/050692
§ 371 (c)(1),
(2) Date: May 19, 2022

(87) PCT Pub. No.: WO2021/107771
PCT Pub. Date: Jun. 3, 2021

(65) Prior Publication Data
US 2022/0412168 A1     Dec. 29, 2022

(30) Foreign Application Priority Data

Nov. 25, 2019   (NL) .................................. 2024306

(51) Int. Cl.
*E21B 7/12*    (2006.01)
*E21B 7/124*   (2006.01)

(52) U.S. Cl.
CPC .............. *E21B 7/122* (2013.01); *E21B 7/124* (2013.01)

(58) Field of Classification Search
CPC ......... E21B 7/122; E21B 7/124; Y02E 10/72; Y02E 10/727
See application file for complete search history.

(56) References Cited

U.S. PATENT DOCUMENTS

| 4,387,881 A * | 6/1983 | McDuffie ............ E02B 17/0818 |
| | | 254/105 |
| 4,395,160 A | 7/1983 | Dejong |

(Continued)

FOREIGN PATENT DOCUMENTS

| GB | 2470763 A | * 12/2010 | ............. E21B 7/124 |
| GB | 2470763 A | 12/2010 | |

(Continued)

OTHER PUBLICATIONS

Bauer, Seabed Drilling for Marine Energy, Oct. 2018.

(Continued)

*Primary Examiner* — James G Sayre
(74) *Attorney, Agent, or Firm* — Polsinelli PC

(57) ABSTRACT

A subsea vertical drilling machine is disclosed, having:
  a drill assembly formed by:
    a riser pipe having a first end, a second end, and a length extending between the first and second ends; and
    a drilling machine body, including a drilling head, coupled to the first end of the riser pipe;
  and
  a vertical feed system configured for advancing the drill assembly in a vertical direction.
The riser pipe is provided with at least one rack extending along at least a part of the length of the riser pipe, and the vertical feed system comprises a motor coupled to a pinion, the pinion arranged for engaging with the rack for advancing the drill assembly.

19 Claims, 10 Drawing Sheets

(56) References Cited

U.S. PATENT DOCUMENTS

2010/0193247 A1    8/2010  Riddle et al.
2013/0327543 A1*  12/2013  Reddy .................... E21B 19/14
                                                          166/85.1
2016/0348332 A1   12/2016  Talbert et al.

FOREIGN PATENT DOCUMENTS

KR       20190005592 A      1/2019
WO    WO-2012074391 A1 *   6/2012    ........... E02B 17/021

OTHER PUBLICATIONS

BAUER Maritime Technologies, BAUER Maschinen GMBH, Jan. 2016.
Bauer's Triple A, BAUER Renewables Ltd., Bishops Stortford, CM23 3DH, United Kingdom.
TMS delivered subsea pile drilling tool, https://tms.nl, Oct. 29, 2019.
Pile drilling tools | Offshore Equipment | TMS Supplies, https://tms.nl, Oct. 30, 2019.

* cited by examiner

Fig. 2a
Fig. 2b
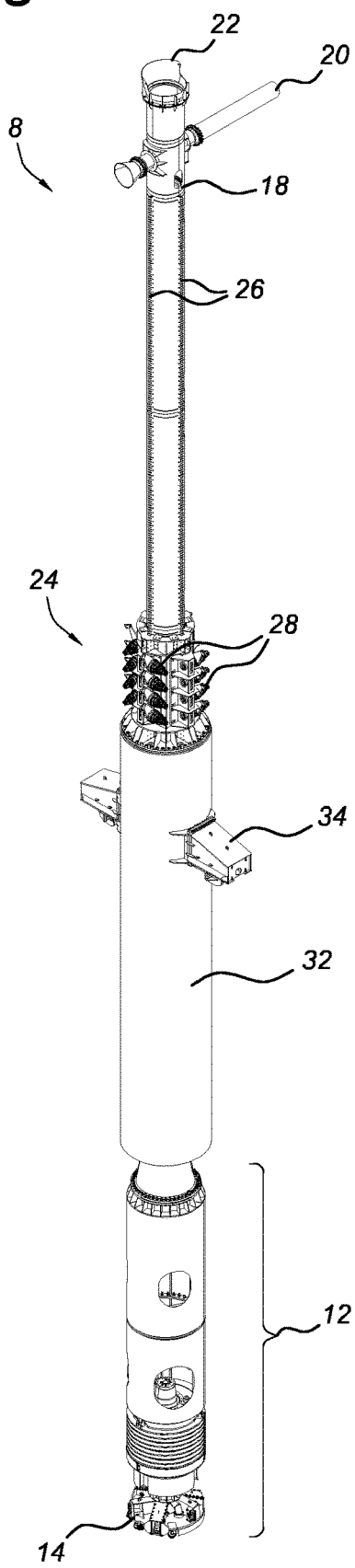
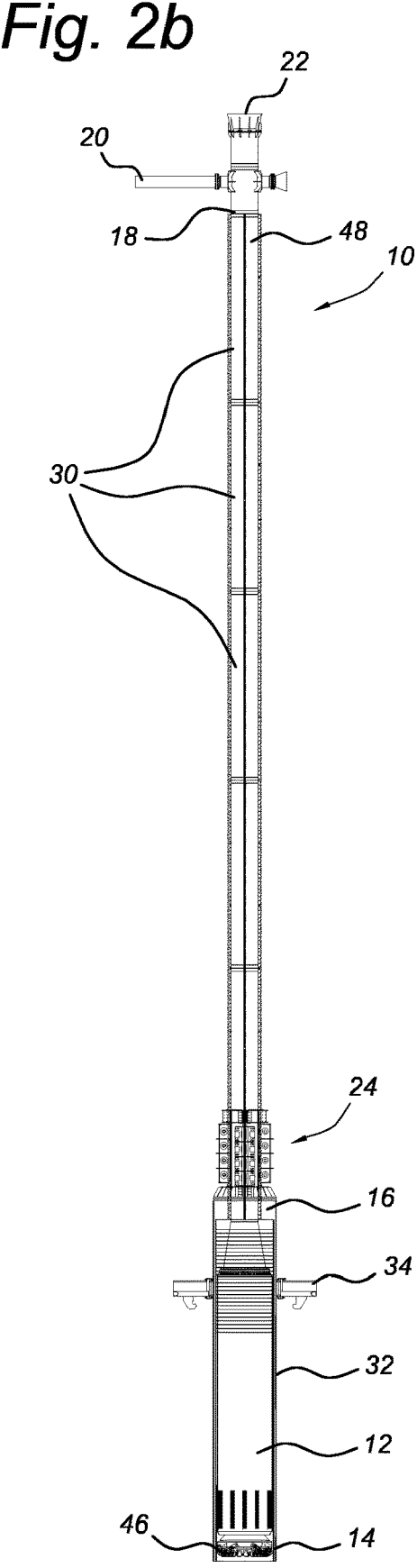

NEARSHORE SUBSEA DRILLING

FIELD OF THE INVENTION

The present invention relates to a subsea vertical drilling machine and associated method for seabed drilling, in particular for setting and drilling a pile or casing into the seabed for forming offshore foundations. It is particularly suitable for nearshore applications, for example for forming foundation piles for wind energy installations.

BACKGROUND ART

The interest in renewable energy systems has led to the application of various offshore energy resources, such as offshore wind farms. As the field of offshore wind farms evolves, a desire has been observed to move to locations further from shore, to locations at sea having greater water depths.

In order to realize this, the energy installations, such as windmills, must have stable foundations in, and/or anchoring to, the seabed. The development towards increased water depths and increased distances from shore leads to challenges when forming the foundations. At the same time, the influence of drilling and pile driving in the seabed on the marine environment, for example noise and vibrations causing disturbances to marine life, must be kept under control.

In "Bauer Maritime Technologies", © BAUER Maschinen GmbH 1.2016, and in "Seabed Drilling for Marine Energy", downloadable via http://www.bauer-renewables.co.uk/export/shared/documents/pdf/bst/print/905_042_2_Seabed-Drilling-for-Marine-Energy.pdf, various systems for seabed drilling are shown.

A subsea pile drilling tool for relief drilling of jacket piles is described in http://www.tms.nl/documents/news-items/subsea-pile-drilling-tool.xml?lang=en.

However, these have limited production rates and pushdown capacity, and do not offer the possibility of sufficient drilling depths in a range of different ground conditions, such as rock. Furthermore, in general these drilling tools requires a casing for clamping thereto during drilling operation, the casing already set into the ground or drilled into the ground during the drilling operation.

SUMMARY OF THE INVENTION

It is an object of the invention to provide a subsea drilling machine having increased drilling rates.

It is a further object of the invention to provide a subsea drilling machine providing increased production rate of setting and drilling a pile or shaft in the seabed.

It is a further object of the invention to provide a subsea drilling machine enabling large drilling depths, at greater water depths.

At least some of these objects are achieved by a subsea drilling machine as defined in claim 1, a subsea drilling machine as defined in claim 11, and/or a subsea drilling machine as defined in claim 14.

Embodiments of the invention are claimed in dependent claims.

In a first aspect, a subsea drilling machine is provided, comprising:
a drill assembly comprising:
  a riser pipe having a first end, a second end, and a length extending between said first and second ends; and
  a drilling machine body coupled to the first end of said riser pipe, said drilling machine body comprising a drilling head;
  and
a feed system configured for advancing said drill assembly in a first direction;
wherein said riser pipe is provided with at least one rack extending along at least a part of the length of the riser pipe; and wherein said feed system comprises a motor coupled to a pinion, said pinion arranged for engaging with said rack for advancing said drill assembly.

The rack and pinion cooperate to enable a substantially continuous advancement, and retraction, of the drilling head into, and out of, the seabed. There is no need to interrupt the drilling action, such as for resetting the system at the end of a stroke, or similar solution. Also, the rack and pinion system enables increased push down forces of the drill into the seabed. Hereby, increased drilling rates can be achieved.

The feed system enables fine feed control of drilling rates and the drill force applied at the cutting face of the drilling head. This enables the drilling machine to be applied to a range of different ground conditions, ranging from loose sand, to stiff clay and to hard rock.

In alternative solutions, the cooperating rack and pinion can be substituted with a hydraulic arrangement, as will be described in further detail herein below with reference to a second aspect of the invention.

As defined above, the drilling machine body, comprising the drilling head, is suspended from, and driven by, the riser pipe.

By the drill assembly as defined herein, the riser pipe receives, reacts to, and/or transmits the operational drilling torque, the crown force and the pullback force. It also reacts the environmental wave, wind and current loadings. The torque from the drilling head is transferred, via the riser pipe, to the feed system, and further into the structure to which the feed system is fixed, e.g. by clamping.

The rack preferably forms an integrated structure of the riser pipe.

The length of the riser pipe and the extension of the rack along the riser pipe sets the drilling depth which can be achieved without interrupting the operation. The subsea drilling machine is therefore referred to as a single pass system.

The at least one rack preferably extends over substantially the entire length of the riser pipe. Thereby, the drilling depth enabled by the machine can be maximized.

Preferably, the riser pipe is provided with a plurality of said racks, said racks distributed along a circumference of said riser pipe, each rack extending along at least a part of the length of the riser pipe, and wherein said feed system comprises a corresponding plurality of pinions or sets of pinions, each pinion or set of pinions arranged for cooperating with one rack. The racks preferably extend along substantially the entire length of the riser pipe, and are symmetrically distributed along its circumference. Preferably, 2, 3 or 4 racks are provided on the riser pipe. Thereby, a stable positioning and movement of the riser pipe with respect to the feed system can be realized.

The vertical feed system may comprise a plurality of pinions for each rack. By arranging a plurality of pinions to engage with each rack, the stability and/or reliability of the advancement action can be increased.

The vertical feed system can also be operated in reverse, for retracting the drill assembly at the end of a drilling operation when a desired bore depth has been reached. Also, it may be operated in reverse for partially retracting the drilling head during operation, for example when a casing is set and drilled into the seabed, as will be described in more detail further below.

The feed system is generally a vertical feed system and said first direction is a vertical direction. The subsea drilling machine can then also be referred to as a vertical drilling machine, as it is designed for drilling substantially vertically into the ground or seabed. However, the drilling machine may be arranged to drill in directions other than vertical, e.g. for setting racked piles on offshore or nearshore structures.

The drilling head is provided with drill units and/or cutters, which may be selected according to the soil or ground conditions of the drilling location. The drilling head can thereby be adapted to a range of different ground conditions.

The drilling head may comprise under-reamers. When activated, these extend radially outwards from the drilling head, extending the cutting diameter of the subsea drilling machine. The actuation, e.g. powering, of the under-reamers is generally provided in the drilling head.

The drilling head, in particular the drill units and/or cutters, may be driven locally via a sub-sea gearbox and a motor arranged in the drilling machine body.

The drilling head is preferably designed such that its diameter can be varied. The diameter generally ranges within a range of 2 to 3.5 meters, or even larger. In many applications a nominal or default diameter of 3 meters is used.

Also the outer diameter of the drilling machine body may be adjustable, such as to match the drilling diameter. To this end, the drilling machine body may be provided with adjustable and/or interchangeable external skis. By setting these in accordance with the drilling diameter, stability can be provided to the drilling machine body during drill advancement.

Hydraulic and/or electrical umbilical, cabling or routings for providing control, power feed, and/or other services to the components arranged in the drilling machine body may be arranged internally in the riser pipe. Thereby, these can be protected from the environmental and/or operational elements.

The riser pipe is further advantageously equipped, at its second, or upper, end with docking features or a docking station for coupling to a lifting tool for lifting the drill assembly into and out of the water.

The riser pipe preferably comprises a plurality of riser pipe modules, each riser pipe module provided with at least one rack extending along its length; said riser pipe modules coupled to one another such that the at least one rack of the different modules are substantially aligned with one another. Thereby, the length of the riser pipe can be set to approximately correspond to the length of the pile foundation. The riser pipe can be assembled such that the length thereof corresponds to the length of the pile foundation. The modules are preferably bolted together, forming a complete riser pipe, prior to the drilling operation. Thereby, there will be no need to add riser pipe modules, or sections, during drilling operations. The length of the riser pipe modules, or sections, ranges between 5 to 15 meters, preferably 10 meters.

The feed system may be coupled to a tube, also referred to as overshot tube, said tube configured for coupling to a second entity such as a drilling machine receiving section of a template, and substantially fixating said feed system with respect to said second entity. To this end, the tube may be provided with a collar, which may also be referred to as landing interface. Thereby, the feed system can be clamped and/or otherwise fixedly coupled to a template, such as a seabed template, a conductor template and/or a pilegate, to be driven into the seabed. The socket may be configured to clamp externally to a template for cased socket drilling and open socket drilling, or internally to the pile for pile relief drilling. Thereby the drilling loads and the environmental loads can be transferred into the template or the relief drilled pile. By this arrangement, the rotational cutting speeds may be increased, providing high drilling production rates. The rotational torque can be increased, providing high drilling power. For casing installation, a high pushdown capacity can be achieved. Thereby, higher production rates can be achieved than the prior art systems.

The overshot tube further protects said drilling head prior to and/or after a drilling operation. The overshot encloses the drilling head prior to and during insertion of the drill into the template. After the drilling operation, the drilling head can be retracted back into the overshot tube, prior to lifting the drill out of the template and/or a sacrificial casing inserted into the seabed during drilling operation.

In some embodiments, the subsea drilling machine further preferably comprises a spoil removal system; said spoil removal system comprising a conduit extending through said drilling head and said riser pipe, and a spoil exhaust provided at the second end of said riser pipe. Hence, a solid spoil pipe is provided internal of the riser pipe and the drilling head, thereby being protected by the riser pipe. The spoil pipe is arranged to transfer spoil cuttings away from the drilling head and drill cutting faces provided thereon, and to the spoil exhaust. The subsea drilling machine preferably comprises a pump, also referred to as dredge pump, arranged in said drilling machine body, in particular in or close to the drilling head, said pump arranged for pumping said spoil from said drilling head to said spoil exhaust. Thereby, the spoil removal capacity, and thereby drilling rate, can be increased, in comparison to air lift spoil removal systems.

Alternatively, in other embodiments, the drilling machine can be configured to use air lift spoil removal.

According to the above, the components of the drilling machine, i.e., the riser pipe, advantageously made up of a plurality of sections or modules bolted together, and the drilling machine body including the drilling head, and the feed system, are assembled together such as to form a single unit which can be lifted, by a crane, from the vessel, and positioned and lowered with respect to the template, and subsequently released from the crane. During drilling operations, no crane is required. The crane of the vessel is thereby available for other operations performed on or from the vessel.

The subsea drilling machine may further comprise one or more control units configured for controlling operation of one or more of the feed system, the drilling machine, in particular the drilling head driving system, and/or the spoil removal system. The control unit may be configured to control operation of one or more parts or components of the feed system, the drilling machine, and/or the spoil removal system. Thereby, the subsea drilling machine, or at least parts thereof, may be configured for self-contained (semi-) autonomous operation.

According to a second aspect, a subsea drilling machine is provided, comprising:
  a drill assembly comprising:
    a riser pipe having a first end, a second end, and a length extending between said first and second ends; and a drilling machine body coupled to the first end of said riser pipe, said drilling machine body comprising a drilling head; and a feed system configured for advancing said drill assembly in a first direction, wherein said feed system comprises:

a first feed subsystem, comprising a first set of hydraulic actuators arranged to induce a movement of a first gripper along said first direction, said first gripper comprising first gripping means for gripping and/or clamping the riser pipe upon actuation of said first gripping means; and a second feed subsystem, comprising a second set of hydraulic actuators arranged to induce a movement of a second gripper along said first direction, said second gripper comprising second gripping means for gripping and/or clamping the riser pipe upon actuation of said second gripping means.

The feed system of the drilling machine according to the second aspects forms an alternative to the feed system, and the one or more racks provided on the riser pipe, of the drilling machine of the first aspect. The first and second gripping means may comprise bladder means, which may be operated hydraulically and/or pneumatically to grip or clamp the riser pipe, with a force sufficient for carrying the weight of the riser pipe and for applying a pushing force advancing the drill assembly into the ground or seabed.

The drill assembly, in particular the drilling head, can be substantially continuously advanced, by operating the first and second feed subsystems in an alternating manner. While the first set of hydraulic actuators are operating such as to move the riser along the first direction, via the first gripping means activated to grip or clamp the riser, the second gripping means are in a deactivated state, such as to not grip or clamp the riser, and the second set of hydraulic actuators are set, or reset, in an initial state, such as to be ready for activation, when the first set of hydraulic actuators reach the end of their stroke, or actuation interval. When the first set of hydraulic actuators reach the end of their stroke, i.e., the end of their movement range, the second gripping means are actuated and the first gripping means deactivated, and the second set of hydraulic actuators are activated, thereby continuing the advancement of the riser pipe. Hence, by operating the first and second feed subsystems in an alternating manner, the drill assembly can be advanced in a substantially continuous manner.

The advantages described with respect to the first aspect, achieved by the rack and pinion, can thereby, at least to a large extent, alternatively be achieved by using hydraulic actuators.

Various embodiments of the drilling machine of the first aspect can be applied to the drilling machine of the second aspect.

According to a third aspect, a subsea drilling machine is provided, comprising:

a drill assembly comprising:

a riser pipe having a first end, a second end, and a length extending between said first and second ends; and a drilling machine body coupled to the first end of said riser pipe, said drilling machine body comprising a drilling head;

a feed system configured for advancing said drill assembly in a first direction; and a spoil removing system comprising a conduit extending through said drilling head and said riser pipe, and a spoil exhaust provided at the second end of said riser pipe.

As described above with reference to the spoil removing system of the drilling machine according to the first aspect, the internal spoil removing system enables efficient spoil removal, contributing to an increased drilling rate.

The drilling machine preferably comprises a pump, also referred to as dredge pump, arranged in said drilling machine body, said pump arranged for pumping said soil from said drilling head to said soil exhaust.

The subsea drilling machine of the third aspect may further comprise any one or more features and/or embodiments of the subsea drilling machine of the first aspect.

The subsea drilling machines of the first, second and third aspects, respectively, may comprise corresponding features and/or embodiments, as described above, the technical effects and advantages thereof corresponding.

According to a fourth aspect, a method for drilling a hole in seabed is provided, the method comprising the steps of:

providing a drilling assembly comprising a riser pipe and a drilling machine body coupled to the first end of said riser pipe, said drilling machine body comprising a drilling head;

providing a feed system configured for advancing said drill in a first direction;

assembling said drilling assembly with said feed system such as to form a drilling machine;

arranging a template onto the seabed, said template comprising one or more drilling machine receiving sections;

arranging said drilling machine in one of said drilling machine receiving sections;

fixating said feed system with respect to said template;

advancing said drilling head into said seabed by operating said feed system, by substantially continuously moving said riser pipe with respect to said feed system, while operating said drilling head; and retracting said drill from said bore hole after having reached a final depth of said vertical bore hole.

The method according to the fourth aspect is advantageously performed using the subsea drilling machine according to the first aspect or the second aspect. Thereby, technical effects and advantages as described above are achieved with the method.

The step of advancing said drilling head is advantageously performed by a rotating pinion engaging with a rack extending along at least a part of a length of said riser pipe. This may be performed by the subsea drilling machine of the first aspect.

Alternatively, the step of advancing said drill assembly can be performed by alternatingly operating a first feed subsystem and a second feed system; wherein one of the first and second feed subsystem is operated to advance the drill assembly while the other one of the first and second feed subsystem is reset. This may be performed by the subsea drilling machine of the second aspect.

The method may further comprise the steps of:

prior to said step of arranging said drilling machine in one of said drilling machine receiving sections, arranging a casing substantially around the drilling machine body.

Since the drilling machine according to the present invention does not require a casing, or a cased hole, for advancing the drilling head into the ground, the length of the casing does not need to correspond to the drill depth. The length of the casing may be selected such as to stabilize the drill hole during the drilling operation and during subsequent operations, such as introduction of a pile into the drill hole. Thereby, a casing length corresponding to the depth of unstable layers of the ground or seabed may be sufficient. When left behind in the hole after the drilling operation, the casing may be referred to as a sacrificial casing.

The casing may advantageously be clamped or fixated with respect to the drilling machine body by clamp units, e.g. in the form of bladders, provided on the drilling machine body. By inflating/deflating the bladders, the casing can be clamped/unclamped with respect to the drilling machine body.

The casing may be arranged on the drilling machine by lowering the drill assembly over the casing, thereby entering the drilling machine body into the casing. Once a specified relationship between the casing and the drilling machine body has been achieved, the clamp units may be activated such as to, temporarily, lock the casing with respect to the drilling machine body. The casing and the drilling machine may be simultaneously lowered onto the seabed. The casing and the drilling machine may be simultaneously advanced, at least unto a certain depth, into the seabed as one unit.

In embodiments where the drilling assembly is provided with an overshot tube as described above with reference to the first aspect, the casing is preferably arranged between the overshot tube and the drilling machine body, in such a way as to be substantially fully arranged there between when lowering the drilling machine into the water.

The casing may advantageously be advanced into the seabed together with the drill assembly.

The position of the drill head relative to an outer end of the casing may be set in accordance with ground conditions at the drill location. Thereby, the drilling machine according to the present invention is suitable for a wide range of different ground conditions. If needed, the position of the drill head with respect to the casing can be adjusted during the drilling operation.

During said step of advancing the drill assembly into the seabed, said drilling head may protrude ahead of the casing. This is advantageous when drilling in rock. By the drilling head protruding out of the casing, the drilling head moves in front of the casing, such that the casing can be advanced into the hole formed by operation of the drilling head. Thereby, the casing can be advanced into the ground in concert with the drilling head in rocky grounds.

Alternatively, during said step of advancing the drill assembly into the seabed, said drilling head may be arranged within said casing. This is advantageous when drilling in unstable layers, such as sand and/or clay layers. Operating the drill head inside the casing contributes to a stable drilling operation while drilling in sand and/or clay.

The method may comprise the step of, when the casing has been inserted into the seabed to a casing depth, further advancing said drilling head into said ground. As described above, this depth may be set such as to cover unstable layers at the drill location, stabilizing the drill hole.

The step of advancing said drilling head may comprise activating and operating under reamer cutters of said drilling head such as to drill with a diameter equal to or larger than an outer diameter of said casing.

The method may comprise removing spoil via a spoil return pipe arranged within said drilling machine body and said riser pipe, and discharging said spoil at spoil discharge arranged at a second end of said riser pipe.

The step of retracting may advantageously be performed by operating said feed system in reverse.

The feed system may also be operated in reverse during a part of the drilling operation, e.g. if hitting a boulder or similar while advancing the drill assembly. In such a situation, the advancement of the drill assembly may be interrupted, the drill assembly subsequently reset or repositioned prior to continuing advancement of the drill assembly.

When advancing the drill assembly provided with a casing, as described above, the feed system may be operated in reverse for example in order to adjust the position and/or orientation of the casing, prior to recommencement of the advancement of the drill assembly and the casing.

The methods described above, may advantageously be performed semi-autonomously. One or more of the steps described herein above may be performed (semi-)autonomously, or automatically.

The subsea drilling machine described herein, also referred to as a vertical subsea drilling machine, may advantageously be applied for pile drilling and driving, e.g. for forming foundations for energy installations at sea, such as offshore wind farms. It is equally applicable to other types of marine energy installations, such as, e.g., tidal turbines.

The drilling machine as described herein will expectedly be used at water depths of 50 to 100 meters, for example 70 meters, and drilling depths of up to 50 meters. However, it might be used at water depths up to 200 meters.

As described above, the drilling machine offers open socket drilling, cased socket drilling, and pile relief drilling.

By the riser pipe, assembled to match the drill depth, and provided with racks, which cooperate with pinions of the vertical feed system, a single pass drilling system has been realized.

As described herein above, the drilling machine may be configured to be operated in a self-contained, semi-autonomous manner.

The drilling machine can be used in a variety of ground conditions, including unstable layers such as sand, wherein foundation piles can be set and drilled into the seabed with high stability. A cased borehole may be set and drilled into the unstable layer and the underlying bedrock, using the machine and method as described herein above.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the figures of the accompanying drawings, in which like or same reference symbols denote like, same or corresponding parts, and in which:

FIG. 2*a* shows a perspective view of a subsea drilling machine according to an embodiment;

FIG. 2*b* shows a schematic cross section of FIG. 2*a*;

DESCRIPTION OF EMBODIMENTS

Figure 1:
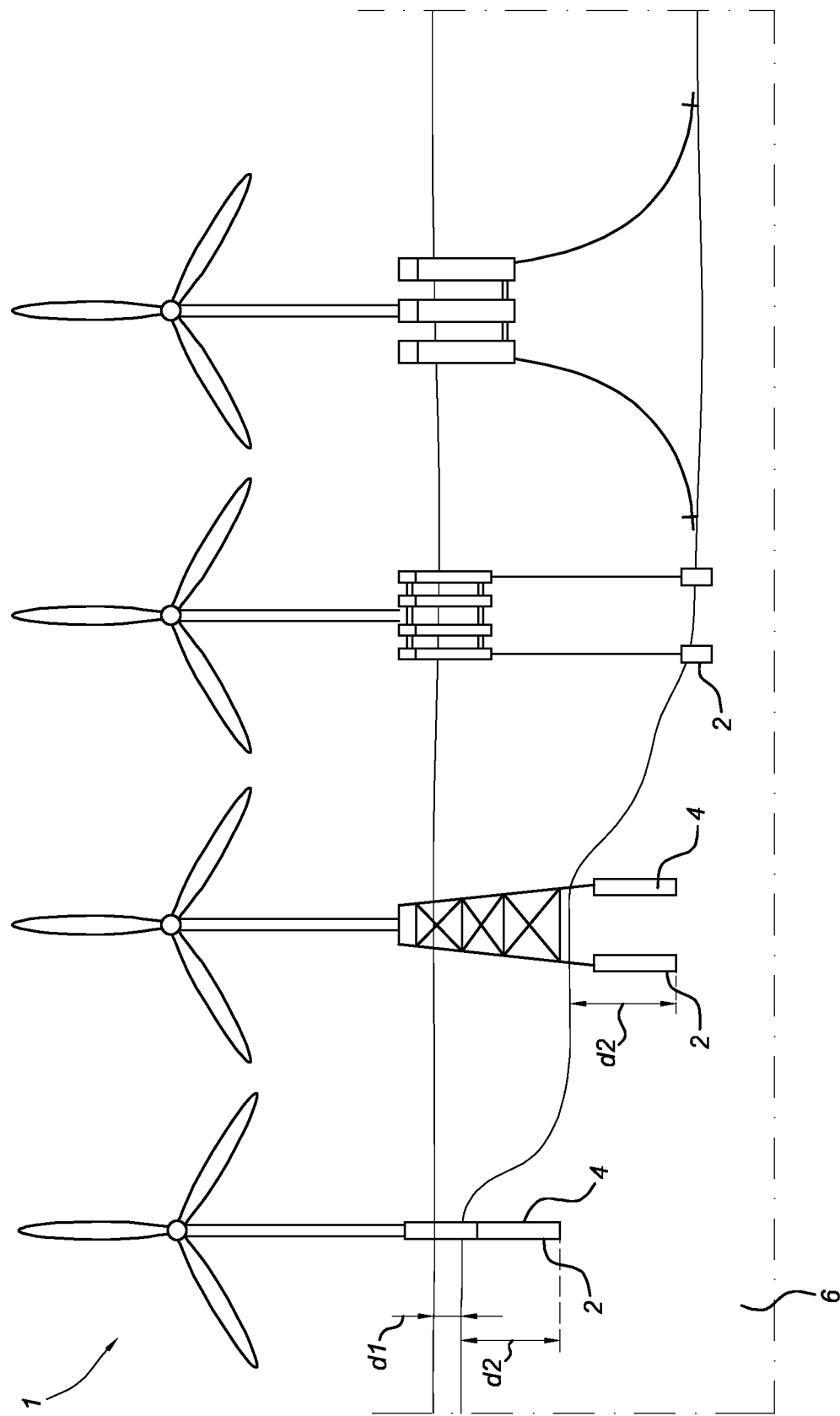
FIG. 1 shows a schematic illustration of off-shore wind energy installations.

FIG. 1 schematically shows energy installations in the form of a wind mill 1, mounted in, or anchored to, the seabed via a foundation 2. FIG. 1 shows different types of foundations 2, all comprising a pile 4 drilled into and formed in the seabed 6. The wind mill is located in sea, at a water depth d1, the pile 4 having a drilling depth d2. As described above, there is a growing interest of locating sea based wind mills at still deeper waters, leading to various challenges, including drilling at larger water depths and reaching larger drilling depths, even at poor ground conditions. The present invention provides a subsea drilling machine for drilling with high drilling, or production, rates at a water depth of typically about 70 to 100 meters, or even up to 200 meters.

FIGS. 2a and 2b show an embodiment of a subsea drilling machine 8, also referred to as vertical subsea drilling machine, according to the present invention. FIG. 2a shows a perspective view of the drilling machine 8, while FIG. 2b shows a schematic cross section thereof. Although herein a vertical drilling machine is described, it can be noted that the same concept can also be applied to a drilling machine drilling in a direction inclined with respect to the vertical direction.

As can be seen in FIGS. 2a, 2b, the drilling machine comprises a riser pipe 10 and a drilling machine body 12 comprising a drilling head 14. The drilling machine body 12 is arranged at a lower end 16, also referred to as first end, of the riser pipe 10. The riser pipe and the drilling machine body are assembled together, forming what is referred to herein as a drill assembly.

At an upper end 18, also referred to as second end, of the riser pipe 10, a spoil exhaust 20 is provided, which is connected to a spoil pipe 48 arranged within the riser pipe. Further, a docking station 22 for a lifting arrangement, is provided and/or coupled to the upper end 18 of the riser pipe.

The drilling machine 8 further comprises a vertical feed system 24, arranged for inducing a movement of the riser pipe 10 such as to advance the drill assembly in the vertical direction with respect to the vertical feed system. Thereby, the drilling head, is advanced into the seabed during drilling operation.

Figure 3A:
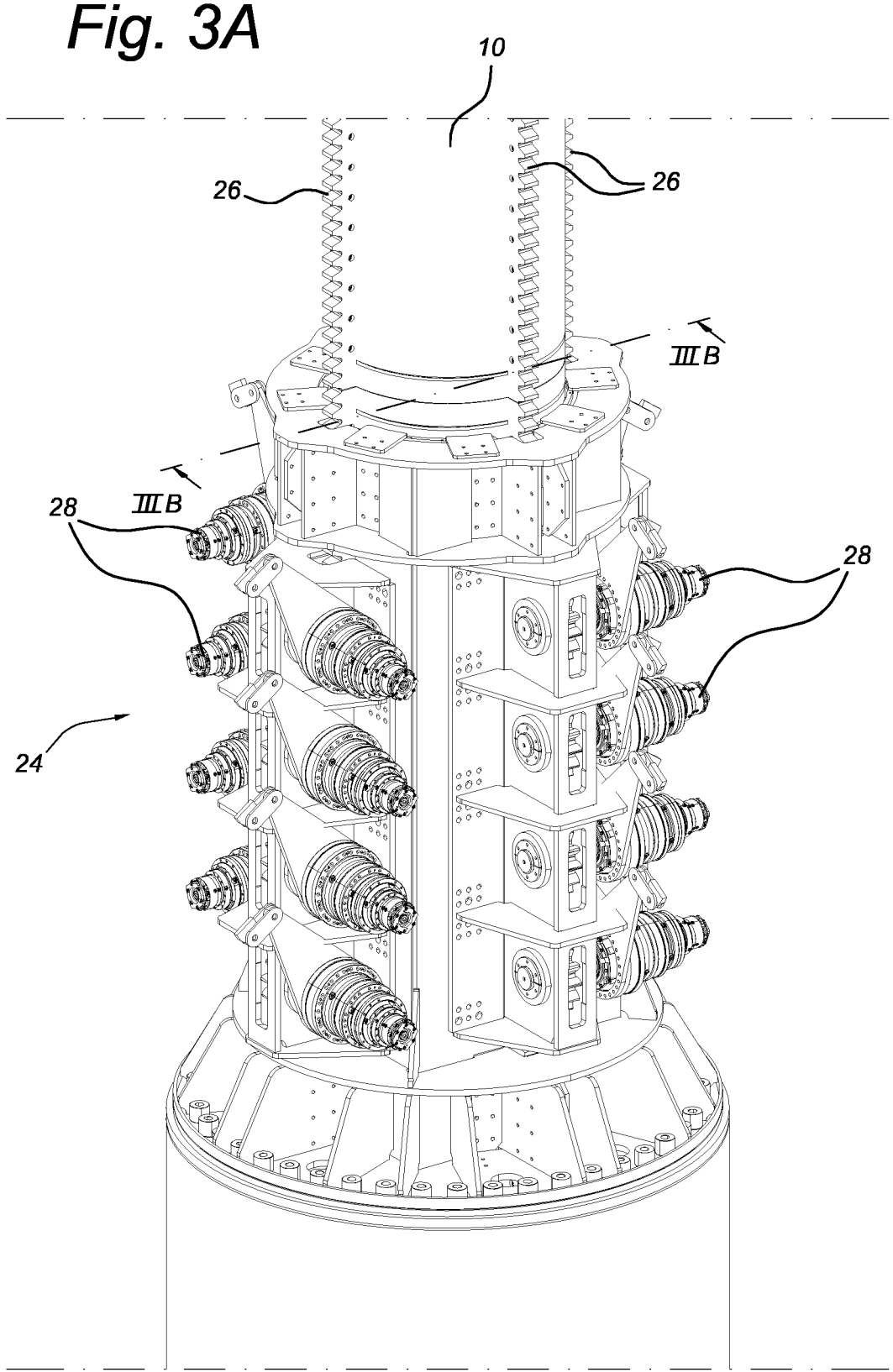
FIG. 3*a* shows a detail of a portion of the drilling machine shown in FIG. 2*a*.
Figure 3B:
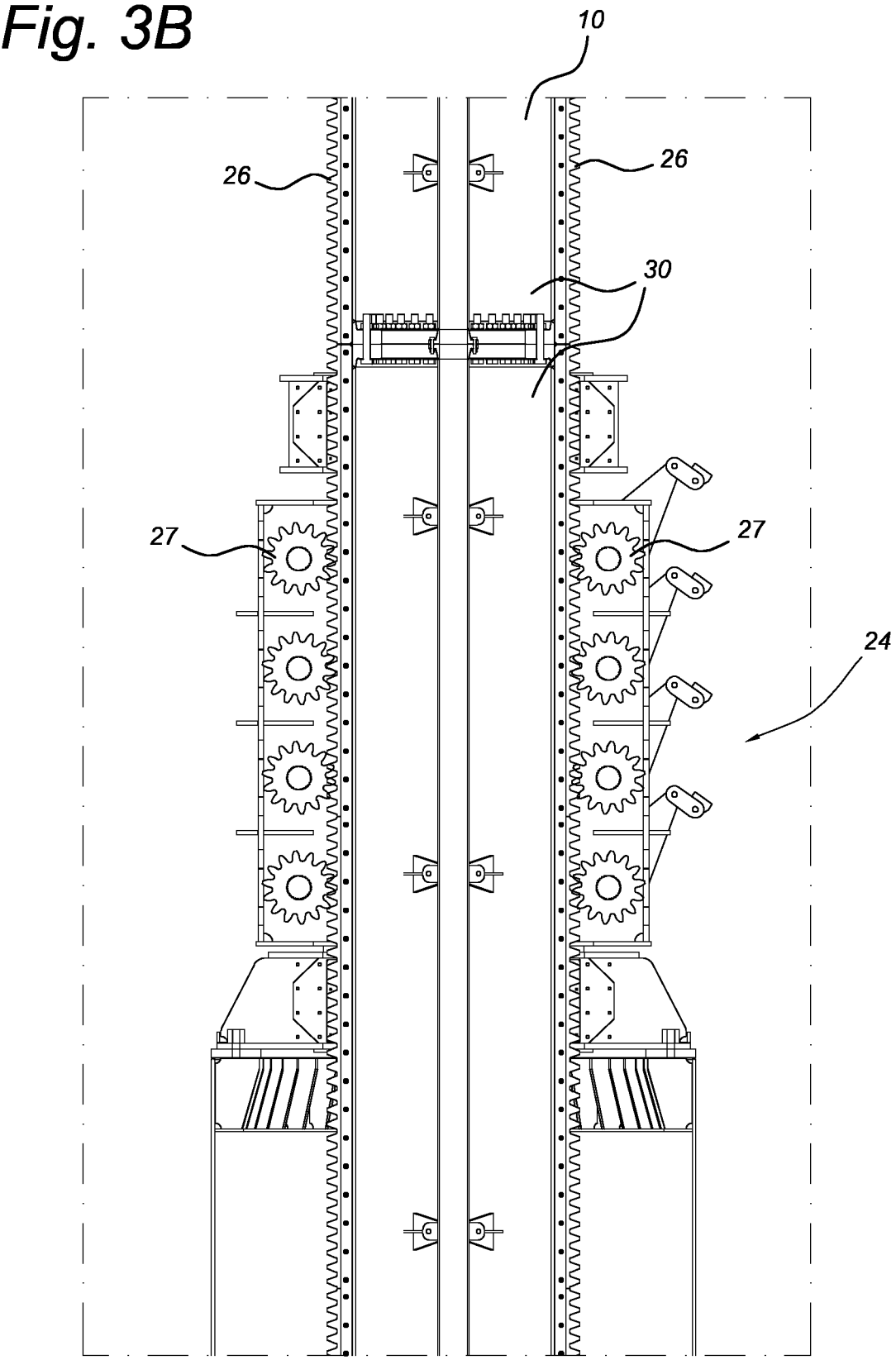
FIG. 3*b* shows a schematic cross section of FIG. 3*a*, showing a detail of the feed system according to an embodiment.

As can be seen in in more detail in FIGS. 3a and 3b, the riser pipe 10 is provided with a plurality of racks 26 extending along substantially the full length of the riser pipe 10. The vertical feed system 24 comprises a corresponding plurality of sets of pinions 27 each driven by a motor 28. The pinions 27 engages with the racks 26 such as to advance the drill assembly.

The racks 26 are symmetrically distributed around the circumference of the riser pipe. The vertical feed system 24 comprises a plurality of sets of pinions 27 and associated motors 28, each set of pinions associated with one of the racks 26. In the illustrated embodiment four racks and four sets of pinions are provided, which has been seen to provide a stable and accurate advancement of the drill assembly. The set of pinions comprises four pinions associated with each rack. However, other numbers may also be possible.

The drilling machine body 12 is suspended from the riser pipe 10, and advanced into the seabed during drilling operation, by means of the cooperating rack and pinion system, which can be seen in detail in FIG. 3b. By the racks 26, extending along the length of the riser pipe 10, and the pinions 27 engaging therewith, the drilling machine body can be advanced in a substantially continuous manner. The drilling depth is mainly limited to the length of the riser pipe 10, in particular to the extension of the racks 26 provided thereon.

As can be seen in FIG. 2b, the riser pipe 10 is made up of a plurality of riser pipe modules, or sections, 30, bolted together such as to form one riser pipe 10. The different modules 30 are oriented with respect to one another such that the racks are aligned. By this arrangement, the length of the riser pipe 10 can be set in accordance with the intended drilling depth d2. The modules are mounted together prior to the start of the drilling operation.

As shown in FIGS. 2a and 2b, the vertical feed system 24 is coupled to an overshot tube 32, provided with a collar 34 configured for coupling to a drilling machine receiving section of a template, as will be described further below. The collar 34 may also be referred to as a landing and locking collar. Thereby, the vertical feed system 24 can be substantially fixated with respect to the seabed template and/or the casing.

The drill assembly, comprising the riser pipe 10 and drilling machine body 12, may be assembled with the vertical feed system 24 and the overshot tube 32, such as to form a single drill. This single drill can be lifted, via the docket station 22, from the vessel and lowered into the sea, to be lowered onto a seabed template, as will be described further below. The overshot tube further acts for protecting the drilling head 14 prior to and/or after a drilling operation, in particular while lowering the drill assembly into the seabed template.

Figure 4:
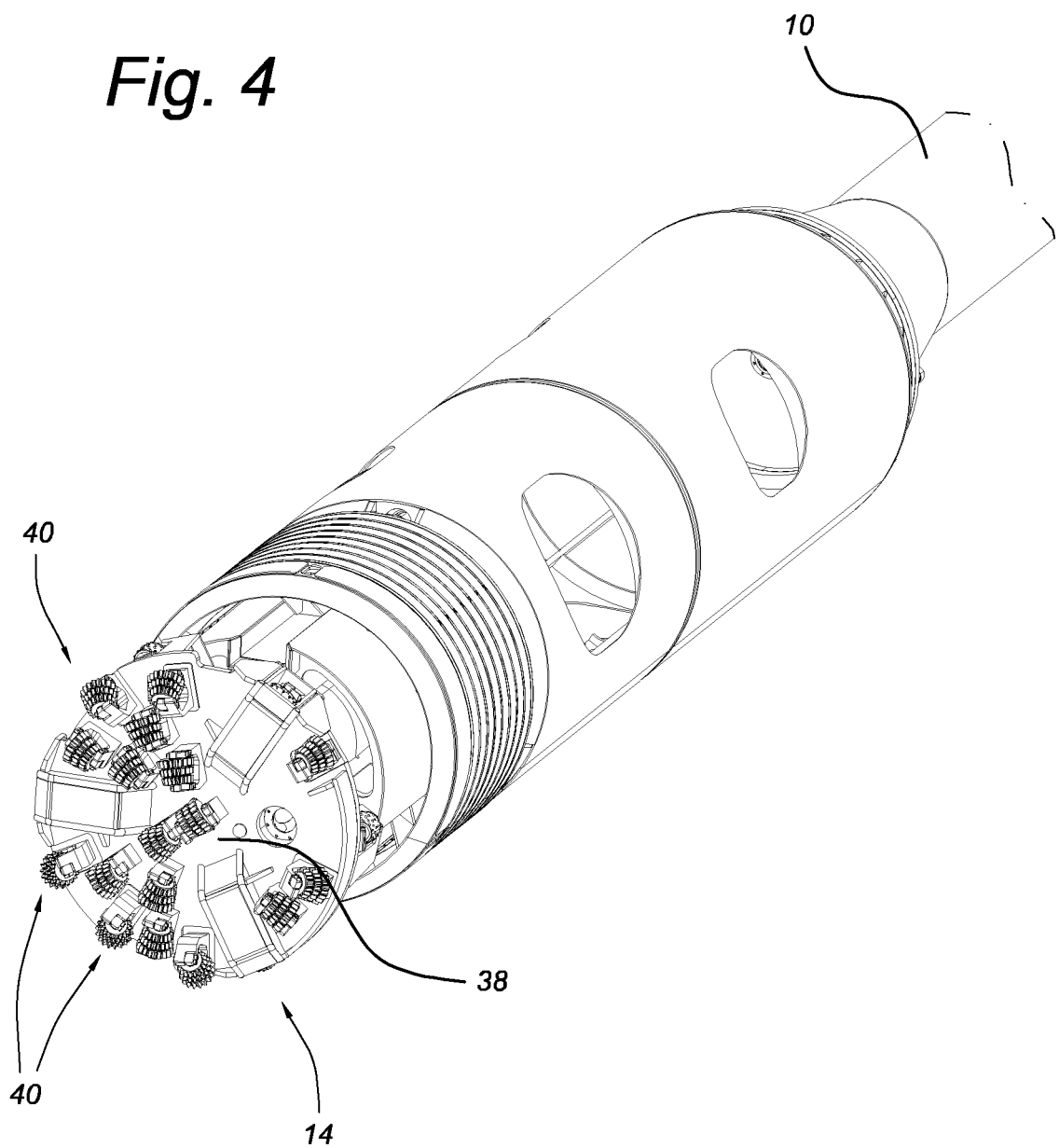
FIG. 4 shows a detail of a drilling head according to an embodiment.

FIG. 4 shows a detail of the drilling head 14.

As can be seen in FIG. 4, the drilling head 14 comprises a plurality of cutters 38, also referred to as drill units, which form the cutting and/or excavating action during the drilling operation. The cutters are selected in accordance with the ground conditions at the drilling site. The drilling head 14 may further comprise a plurality of under-reamers 40, which may be activated to extend in the radial direction during drilling operations, increasing the drilling diameter.

A drill head driving system may be provided in the drilling machine body, for controlling and operating the drilling head, i.e., operating the cutters 38 and, if applicable, the under-reamer cutters 40.

The drilling machine may further comprise one or more control units (not shown) for controlling operation of one or more of the components of the drilling machine, in particular the feed system 24, the drilling machine body 12 including the drilling head 14, and/or the spoil removal system (described herein below). Thereby, the drilling machine may be configured for semi-autonomous operation.

As shown in FIG. 2b the subsea drilling machine further comprises a spoil removal system, which comprises a spoil pipe 48 arranged internally within, and extending at least partly through, the drilling head 14, the drilling machine body 12, and the riser pipe 10. A dredge pump is arranged for suction of the drill cuttings, or spoil, into a spoil inlet 46 arranged in or close to the drilling head, pass it through the spoil pipe, to exhaust it via the spoil exhaust 20.

Figure 5:
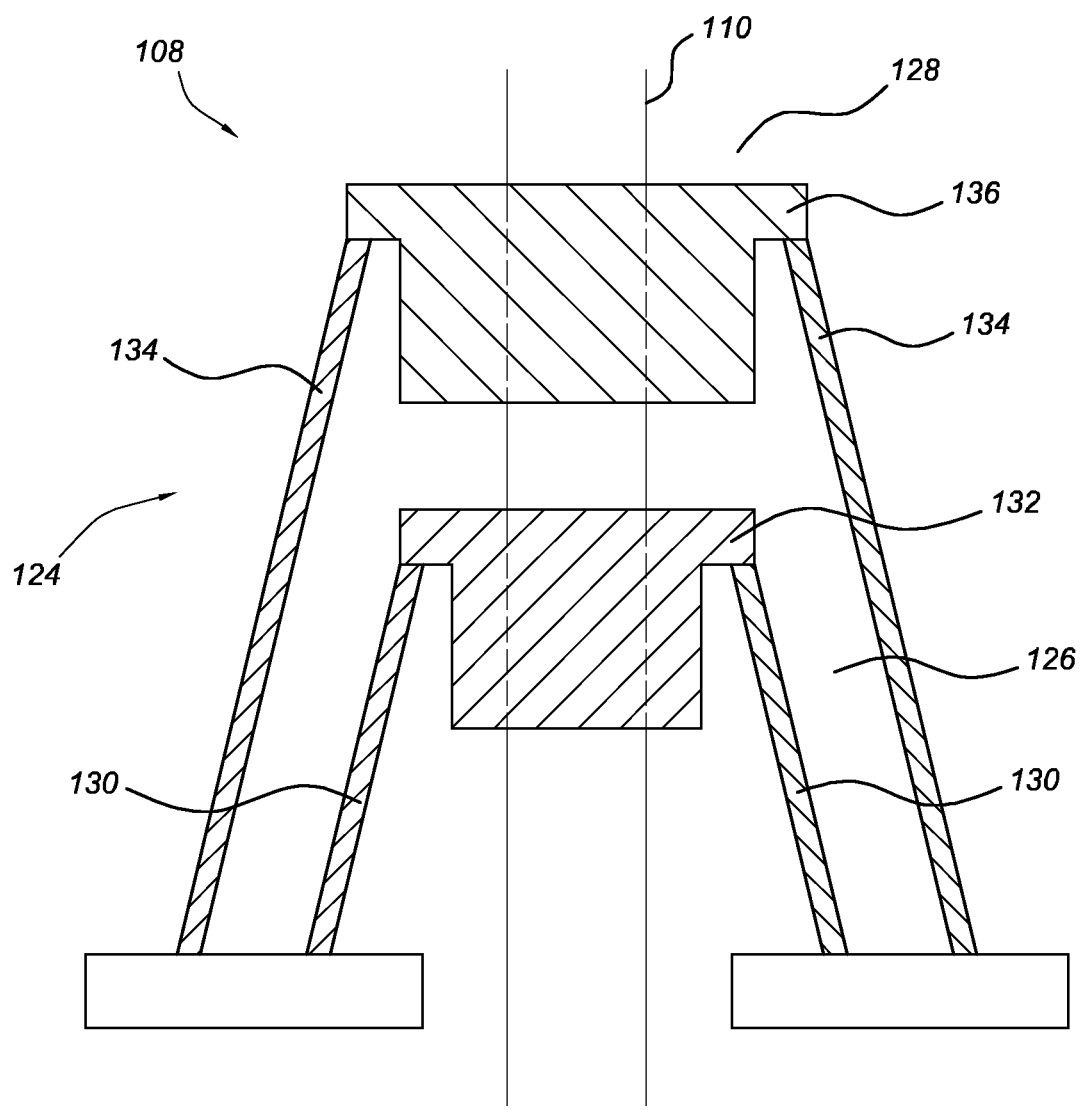
FIG. 5 shows a schematic illustration of a subsea drilling machine according to an alternative embodiment.

According to an alternative solution, the feed system, comprising pinions cooperating with racks provided on the riser pipe, described above with reference to FIGS. 2a, 2b, 3a and 3b, can be substituted with a hydraulic arrangement, which is illustrated in FIG. 5.

FIG. 5 shows a portion of a subsea drilling machine 108 including an alternative feed system based on hydraulic arrangements. The drilling machine 108 comprises a riser pipe 110, which does not have to be provided with racks. Other features of the drilling machine 108 are similar to those described above with reference to FIGS. 2a, 2b, 3a and 3b. The feed system 124, which in particular is a vertical feed system, comprises a first feed subsystem 126 and a second feed subsystem 128.

The first feed subsystem 126 comprises a first set of hydraulic actuators 130, or cylinders, arranged to induce a movement of a first gripper 132 along the vertical direction. The first gripper comprises first gripping means (not shown) for gripping and/or clamping the riser pipe 110 upon actuation of the first gripping means.

The second feed subsystem 128 comprises a second set of hydraulic actuators or cylinders 134 arranged to induce a movement of a second gripper 136 along the vertical direction. The second gripper 136 comprises second gripping means (not shown) for gripping and/or clamping the riser pipe upon actuation of the second gripping means.

The first and second gripping means may comprise hydraulically or pneumatically operated bladder means, for gripping or clamping the riser pipe, with a force sufficient for carrying the weight of the riser pipe and for applying a pushing force advancing the drill assembly into the ground or seabed.

While the first set of hydraulic actuators are operating such as to move the riser along the first direction, via the first gripping means activated to grip or clamp the riser, the second gripping means are in a deactivated state, such as to not grip or clamp the riser, and the second set of hydraulic actuators are set, or reset, in an initial state, such as to be ready for activation, when the first set of hydraulic actuators reach the end of their stroke, or actuation interval. When the first set of hydraulic actuators reach the end of their stroke, i.e., the end of their movement range, the second gripping means are actuated and the first gripping means deactivated, and the second set of hydraulic actuators are activated, thereby continuing the advancement of the riser pipe. Hence, by operating the first and second feed subsystems in an alternating manner, the drill assembly can be advanced in a substantially continuous manner.

Figure 6A:
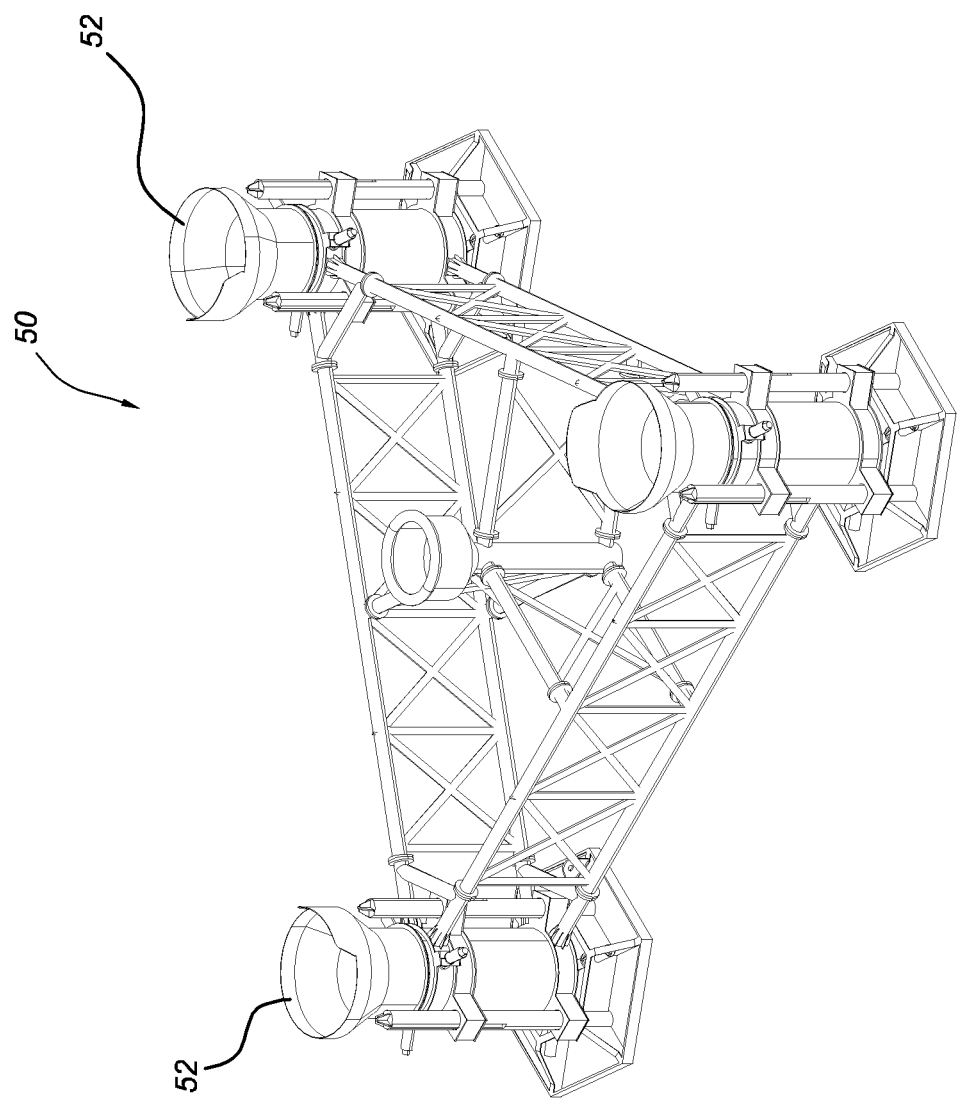
FIG. 6a schematically illustrates a seabed template arranged on the seabed.

The subsea drilling machine is configured to be used together with a template, such as a seabed template 50 shown in FIG. 6a, for mounting and/or holding it with respect to the seabed during drilling operation. The template 50 is generally lifted from a vessel and lowered onto the seabed, using a crane located on the vessel, and subsequently levelled, in a known manner.

The seabed template 50 comprises one or more drilling machine receiving sections 52 for receiving the drill assembly and the vertical feed system. When the drilling machine has been lowered into one of the sections 52, actuators 54 (shown in FIG. 7b) provided on the template are activated to position and orient the drilling machine, in a manner as is known in the art. Once the drilling machine has been correctly positioned, the actuators of the template are deactivated, and the feed system 24 is fixated with respect to the template via the collar 34.

Figure 6B:
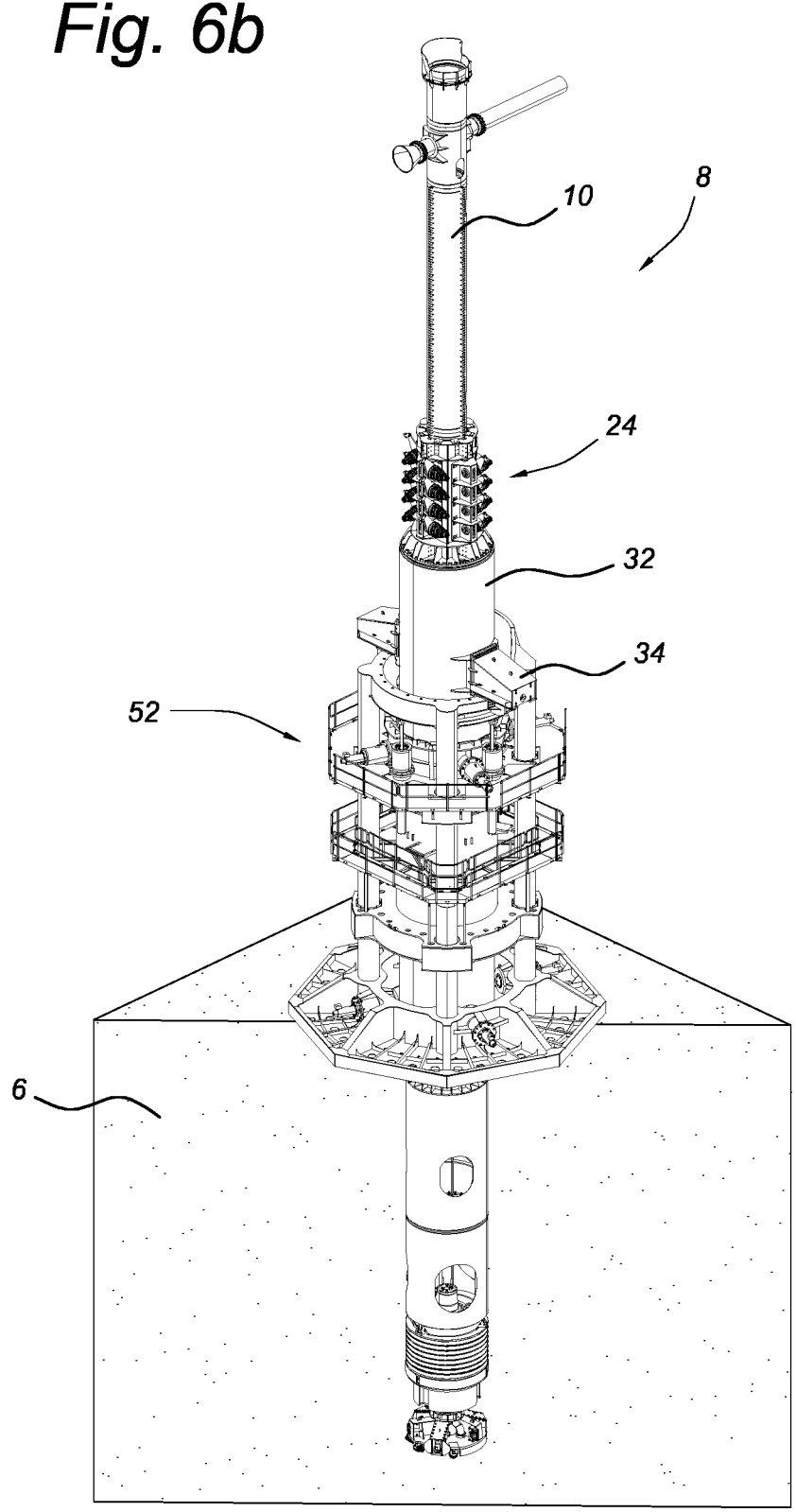
FIG. 6b illustrates a section of the seabed template, with a subsea drilling machine according to embodiments arranged therein.

FIG. 6b schematically illustrates a drilling machine receiving section 52 of a seabed template, with a subsea drilling machine 8 arranged therein and having drilled some distance into the seabed 6. The collar 34 engages with the section 52 of the seabed template.

The operation of the subsea drilling machine and subsea drilling system, such as lowering the drilling machine toward the subsea template, coupling it to the subsea template, and operation of the drilling head, is typically operated from an operator console located on the vessel from which the drilling machine is deployed.

Further a machine monitoring system is provided, for monitoring and/or displaying various parameters associated with the operation of the subsea drilling machine. Such parameters may include drilling depth, drilling advancement rate, drilling advancement force, cutting face rotational speed, dredge pump pressure, machine diagnostics, etc. The machine monitoring system may comprise one or more control units, as mentioned above, configuring the drilling machine for autonomous or semi-autonomous operation.

FIGS. 7a to 7d illustrate initial steps of a method for drilling a vertical hole, or bore, in a seabed using the subsea drilling machine described above. Although described herein with reference to the drilling machine according to the first embodiment, using feeding via a rack and pinion system, the below method can be analogously applied to the drilling machine according to the second embodiment, using a hydraulic feed system. For ease of illustration, FIGS. 7b-7d only show one drilling machine receiving section 52. It is understood by the skilled person, that the seabed template may comprise one or more such sections 52.

Figure 7A:
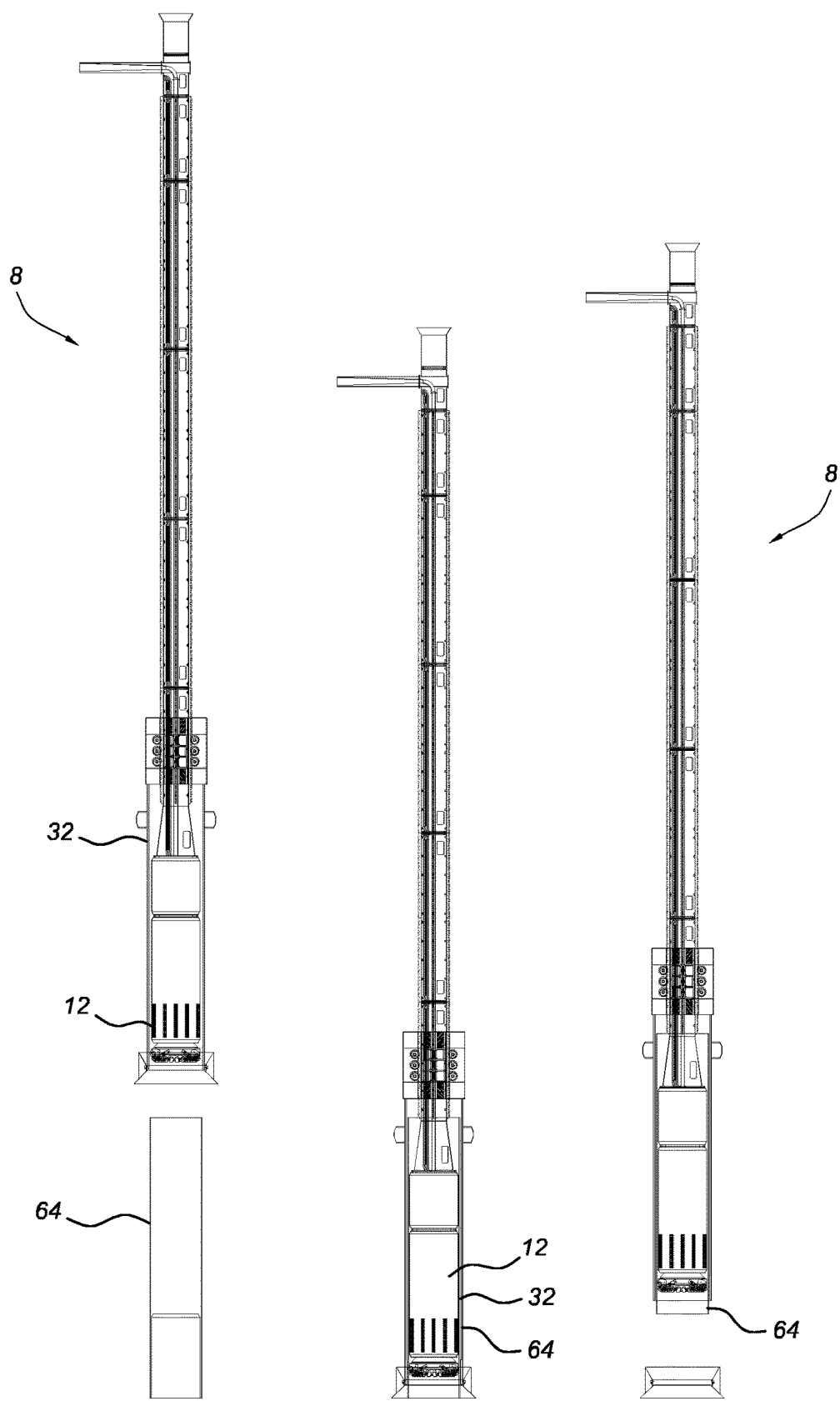
FIG. 7a illustrates mounting of a casing onto the drilling machine body.

FIG. 7a shows the arrangement of a casing 64, which may be used as a sacrificial casing, onto the drilling machine body. As described above, this casing can be drilled into the ground simultaneously with the advancement of the drilling head into the ground, in particular to a certain depth such as to stabilize unstable ground layers surrounding the hole which is being drilled. As also described above, the position of the drilling head with respect to the outer end of the casing can be adjusted based on the ground conditions at the drilling location.

As shown to the left in FIG. 7a, the drilling machine 8, provided with an overshot tube 32, is lowered over the casing 64. This operation is generally performed on a vessel from which the drilling operation is to take place.

The middle portion of FIG. 7a shows the casing 64 substantially fully inserted in between the drilling machine body 12 and the overshot tube 32. The casing is, temporarily, clamped or fixated with respect to the drilling machine body by clamp units, for example in the form of bladders, provided on the drilling machine body.

As shown to the left in FIG. 7a, after the casing has been mounted and fixated to the drilling machine body, the drilling machine, with the casing arranged thereto, can be lifted as one single unit, for deployment into the water.

The seabed template, as shown in FIG. 6a, has been arranged on the seabed, and preferably levelled with respect thereto such as to provide a substantially vertical orientation of a central axis of the section 52. Thereby, the holes, or piles, can be drilled substantially vertical, e.g. such as to form vertically oriented foundations.

Figure 7D:
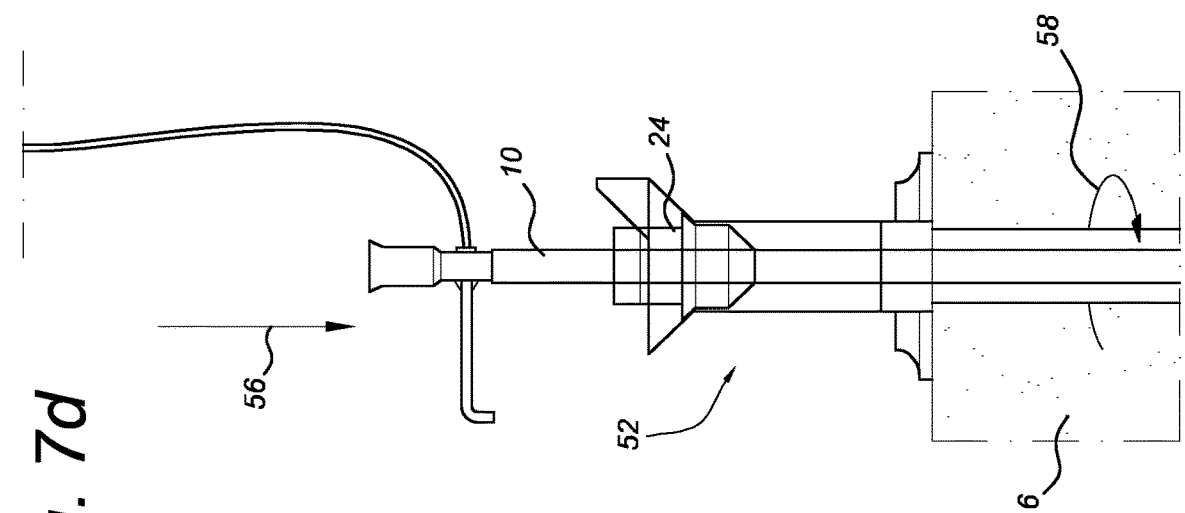
FIGS. 7b to 7d schematically illustrate the feed process of the drilling machine according to embodiments of the invention.
Figure 7C:
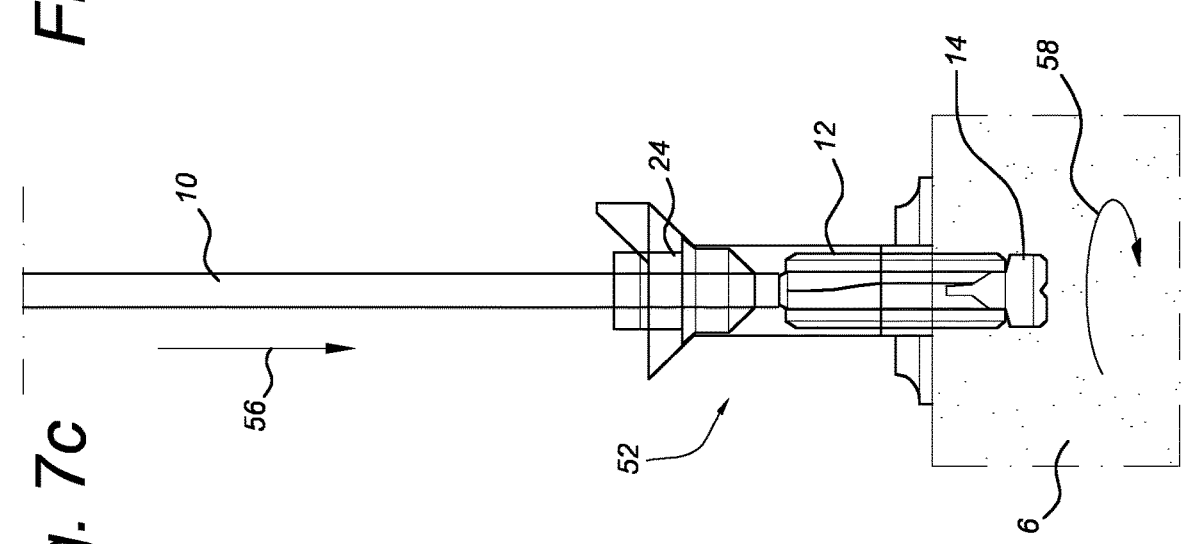
Figure 7B:
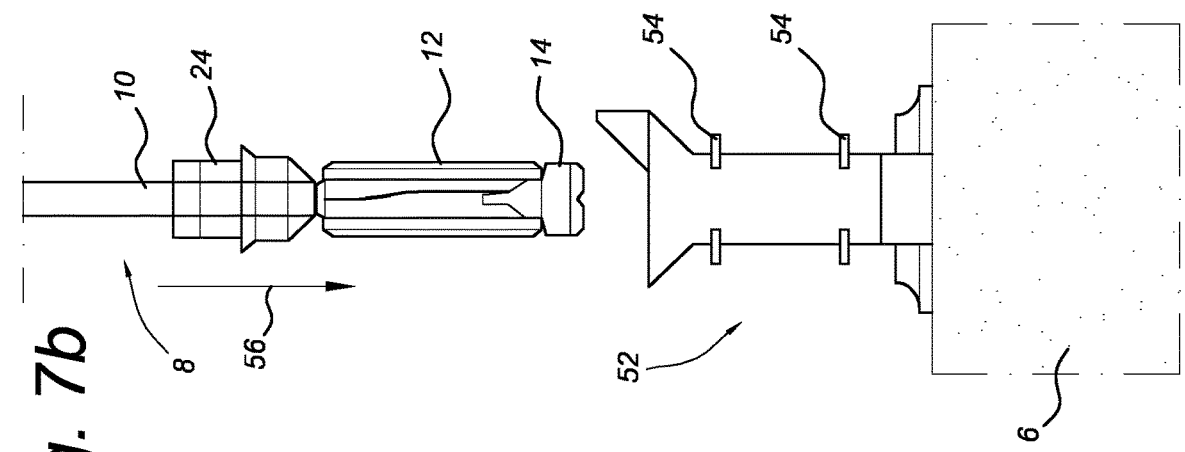

In a first step of a drilling operation, shown in FIG. 7b, the drilling machine 8 is lowered in a vertical direction 56 towards the drilling machine receiving section 52, in order to be positioned in the receiving section 52. During and/or after lowering the drill into the receiving section, its position and orientation can be adjusted, e.g. such as to set it at a center position of the receiving section and orient it in the vertical direction, by means of a actuators 54 provided in the seabed template.

Although not shown in FIG. 7b, the drilling machine may be provided with a casing 64 as described with reference to FIG. 7a prior to lowering it towards the drilling machine receiving section 52. However, this may not be necessary for all applications, and the following description applies independently of whether or not such casing is provided.

Once correctly positioned oriented, the vertical feed system 24 is fixated with respect to the seabed template, as described above.

As illustrated in FIG. 7c, during drilling operation, the drilling head 14, if applicable together with the casing 64, is advanced in the vertical direction 56 into the seabed 6, by means of the rack and pinion system described above. During the advancement in the vertical direction, the drilling head is operated, e.g. by its drill units being rotated in a rotational direction 58, such as to perform an excavating action. The spoil produced during drilling is removed via the spoil removal system described above.

As illustrated in FIG. 7d, the drilling operation, and associated advancement of the drilling head 14 into the seabed 6, can be continued, substantially continuously, for a distance as set by the length of the riser pipe 10 and the extension of the racks along the riser pipe.

Once the intended drilling depth has been achieved, and/or if necessitated during the drilling operation, the drilling head 14 can be retracted from the bore hole by operating the vertical feed system in reverse, i.e., by driving the pinions in a reverse direction. Thereby, also the retraction of the drilling head, and in fact the drill assembly, can be performed in a substantially continuous manner.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The present invention is not limited to the disclosed embodiments but comprises any combination of the disclosed embodiments that can come to an advantage.

Variations to the disclosed embodiments can be understood and effected by a person skilled in the art in practicing the claimed invention, from a study of the figures, the description and the attached claims. In the description and claims, the word "comprising" does not exclude other elements, and the indefinite article "a" or "an" does not exclude a plurality. In fact it is to be construed as meaning "at least one". The mere fact that certain features are recited in mutually different dependent claims does not indicate that a combination of these features cannot be used to advantage. Any reference signs in the claims should not be construed as limiting the scope of the invention. Features of the above described embodiments and aspects can be combined unless their combining results in evident technical conflicts.

The invention claimed is:

1. A subsea drilling machine comprising:
    a drill assembly includes:
        a riser pipe having a first end, a second end, and a length extending between the first and second ends; and
        a drilling machine body coupled to the first end of the riser pipe, the drilling machine body includes a drilling head; and
    a feed system configured for advancing the drill assembly in a first direction,
    wherein the riser pipe is provided with at least one rack extending along at least a part of the length of the riser pipe;
    a spoil removal system includes a conduit extending through the drilling head and the riser pipe, and a spoil exhaust provided at the second end of the riser pipe, and
    wherein the feed system includes a motor coupled to a pinion, the pinion arranged for engaging with the rack for advancing the drill assembly in the first direction.

2. The subsea drilling machine according to claim 1, wherein the at least one rack extends over substantially the entire length of the riser pipe.

3. The subsea drilling machine according to claim 1, wherein the riser pipe is provided with a plurality of the racks, the racks distributed along a circumference of the riser pipe, each rack extending along at least a part of the length of the riser pipe, and wherein the feed system includes a corresponding plurality of pinions or sets of pinions, each pinion or set of pinions arranged for cooperating with one rack.

4. The subsea drilling machine according to claim 1, wherein the feed system includes a plurality of pinions for each rack.

5. The subsea drilling machine according to claim 1, wherein the feed system is a vertical feed system and the first direction is a vertical direction.

6. The subsea drilling machine according to claim 1, wherein the riser pipe includes a plurality of riser pipe modules, each riser pipe module provided with at least one rack extending along its length, and
    the riser pipe modules coupled to one another such that the at least one rack of the different modules are substantially aligned with one another.

7. The subsea drilling machine according to claim 1, wherein the feed system is coupled to a tube, the tube configured for coupling to a second entity, and substantially fixating the feed system with respect to the second entity.

8. The subsea drilling machine according to claim 1, further comprising:
    a pump arranged in the drilling machine body and configured to pump the spoil from the drilling head to the spoil exhaust.

9. The subsea drilling machine according to claim 1, wherein the drilling machine body includes a drilling head driving system for operating the drilling head.

10. The subsea drilling machine according to claim 1, further comprising a control unit configured for controlling operation of one or more of the feed system, the drilling machine.

11. A method for drilling a hole in seabed, the method comprising:
    providing a drill assembly including a riser pipe and a drilling machine body coupled to the first end of the riser pipe, the drilling machine body including a drilling head;
    providing a feed system configured for advancing the drill assembly in a first direction;
    assembling the drill assembly with the feed system to form a drilling machine;
    arranging a template onto the seabed, the template including one or more drilling machine receiving sections;

arranging the drilling machine in one of the drilling machine receiving sections;

fixating the feed system with respect to the template;

advancing the drill assembly into the seabed by operating the feed system, by substantially continuously moving the riser pipe with respect to the feed system, while operating the drilling head;

retracting the drill assembly from the vertical bore hole after having reached a final depth of the bore hole;

removing spoil via a spoil return pipe arranged within the drilling machine body and the riser pipe; and discharging the spoil at spoil discharge arranged at a second end of the riser pipe.

12. The method according to claim 11, wherein the advancing the drill assembly is performed by a rotating pinion engaging with a rack extending along at least a part of a length of the riser pipe.

13. The method according to claim 11, wherein the advancing the drill assembly is performed by alternatingly operating a first feed subsystem and a second feed system; wherein one of the first and second feed subsystem is operated to advance the drill assembly while the other one of the first and second feed subsystem is reset.

14. The method according to claim 11, further comprising:

prior to the step of arranging the drilling machine in one of the drilling machine receiving sections, arranging a casing substantially around the drilling machine body.

15. The method according to claim 14, wherein the casing is advanced into the seabed together with the drill assembly.

16. The method according to claim 14, wherein during the step of advancing the drill assembly into the seabed, the drilling head protrudes ahead of the casing.

17. The method according to claim 14, wherein during the step of advancing the drill assembly into the seabed, the drilling head is arranged within the casing.

18. The method according to claim 14, further comprising:

when the casing has been inserted into the seabed to a casing depth, further advancing the drilling head into the ground.

19. The method according to claim 11, wherein the retracting is performed by operating the vertical feed system in reverse.

\* \* \* \* \*